United States Patent
McIntyre et al.

(10) Patent No.: US 11,887,751 B2
(45) Date of Patent: Jan. 30, 2024

(54) TEXTURED-POWDER BI-2212/AG WIRE AND METHOD OF FABRICATION

(71) Applicants: The Texas A&M University System, College Station, TX (US); Accelerator Technology Corp., College Station, TX (US)

(72) Inventors: Peter McIntyre, Bryan, TX (US); John Scott Rogers, College Station, TX (US)

(73) Assignees: The Texas A&M University System, College Station, TX (US); Accelerator Technology Corp., College Station, TX (US)

( * ) Notice: Subject to any disclaimer, the term of this patent is extended or adjusted under 35 U.S.C. 154(b) by 69 days.

(21) Appl. No.: 17/509,029

(22) Filed: Oct. 24, 2021

(65) Prior Publication Data
US 2022/0130576 A1    Apr. 28, 2022

Related U.S. Application Data

(60) Provisional application No. 63/198,522, filed on Oct. 24, 2020.

(51) Int. Cl.
*H01B 12/06* (2006.01)
*H01B 13/00* (2006.01)

(52) U.S. Cl.
CPC ......... *H01B 12/06* (2013.01); *H01B 13/0036* (2013.01)

(58) Field of Classification Search
None
See application file for complete search history.

(56) References Cited

U.S. PATENT DOCUMENTS

| | | | | |
|---|---|---|---|---|
| 6,418,331 B1 * | 7/2002 | Goldacker | ........... | H10N 60/203 505/231 |
| 10,658,091 B1 * | 5/2020 | Kandel | ................... | H01B 3/46 |
| 10,937,561 B2 * | 3/2021 | Pogue | ...................... | C22C 9/01 |
| 2002/0198109 A1 * | 12/2002 | Wu | ..................... | H10N 60/0801 505/100 |
| 2003/0052309 A1 * | 3/2003 | Sajiki | ................... | C01G 29/006 252/500 |
| 2003/0130128 A1 * | 7/2003 | Han | ................... | H10N 60/0801 505/100 |

(Continued)

FOREIGN PATENT DOCUMENTS

WO    WO-2010110874 A1 *  9/2010  ............... C23C 4/04

*Primary Examiner* — Krystal Robinson
(74) *Attorney, Agent, or Firm* — Winstead PC

(57) ABSTRACT

A composite billet includes an array of textured-powder bars in a geometry that is compatible with assembly and drawing of a billet with LAR~1:1. A method is presented of compressing the bars suitable for the billet geometry in an inert gas environment. Methods of drawing of the billet control the deformation of the composite billet during area-reducing draw to fine wire so that the shape and registration of the constituent bars is preserved. Lastly a method is disclosed to fabricate a cable-in-conduit conductor containing the textured-powder Bi-2212/Ag wires that enables robust forming of windings and also provides in-cable containment of a buffer gas flow under high pressure during the high-temperature heat treatment of the winding that is required to produce optimum superconducting performance in the winding.

13 Claims, 13 Drawing Sheets

(56) References Cited

U.S. PATENT DOCUMENTS

| | | | | |
|---|---|---|---|---|
| 2003/0205403 A1* | 11/2003 | Tanaka | ................ | H10N 60/203 |
| | | | | 174/125.1 |
| 2004/0204322 A1* | 10/2004 | Tanaka | ............... | H10N 60/0856 |
| | | | | 505/100 |
| 2004/0237294 A1* | 12/2004 | Kobayashi | ......... | H10N 60/0801 |
| | | | | 29/868 |
| 2006/0048854 A1* | 3/2006 | Kobayashi | ......... | H10N 60/0801 |
| | | | | 505/430 |
| 2007/0265169 A1* | 11/2007 | Kato | ................ | H10N 60/0801 |
| | | | | 505/434 |
| 2008/0287302 A1* | 11/2008 | Fujino | ............... | H10N 60/0801 |
| | | | | 505/231 |
| 2009/0197771 A1* | 8/2009 | Kobayashi | ......... | H10N 60/0801 |
| | | | | 505/231 |
| 2010/0093546 A1* | 4/2010 | Schlenga | ........... | H10N 60/0856 |
| | | | | 505/231 |
| 2011/0136673 A1* | 6/2011 | Ayai | .................. | H10N 60/0801 |
| | | | | 505/433 |
| 2012/0028809 A1* | 2/2012 | McIntyre | .......... | H10N 60/0801 |
| | | | | 428/397 |
| 2019/0066877 A1* | 2/2019 | Otto | .................. | H10N 60/0268 |
| 2021/0313087 A1* | 10/2021 | Kellams | ................ | H01B 1/026 |

* cited by examiner

TEXTURED-POWDER BI-2212/AG WIRE AND METHOD OF FABRICATION

CROSS-REFERENCE TO RELATED APPLICATIONS

This patent application claims priority from, and incorporates by reference the entire disclosure of, U.S. Provisional Application 63/198,522 filed on Oct. 24, 2020.

TECHNICAL FIELD

The present disclosure relates generally to textured-powder Bi-2212/Ag wire, and more particularly but not by way of limitation to configurations and methods of Bi-2212/Ag wires comprising multiple sub-elements and uniform properties.

BACKGROUND OF THE INVENTION

This section provides background information to facilitate a better understanding of the various aspects of the disclosure. It should be understood that the statements in this section of this document are to be read in this light, and not as admissions of prior art.

Bi-2212 is conventionally fabricated into multi-sub-element wire using an oxide-powder-in-tube (OPIT) method in which a fine powder of Bi-2212 is poured into the aperture of a silver tube, the tube ends are plugged, and the tubes are assembled into a hex-close-packed (HCP) registration. The assembly is drawn, re-stacked and re-drawn to form a multi-sub-element composite wire. The drawing properties of the Bi-2212 cores and the silver matrix are significantly different. The tap density of the powder must be controlled in filling the tubes, otherwise the powder can aggregate during the area-reducing draw and 'lock up' to produce sub-element breaks and sausaging during successive stages of drawing. The billet geometry for OPIT-method wire must be limited to a local area ratio (LAR) Ag:Bi-2212~4:1 so that the silver matrix controls the area-reducing draw to sustain the registration of the cores within the silver matrix as the wire is drawn. Because of this limit on LAR, the cost of the silver content of Bi-2212/Ag wire is comparable to that of the Bi-2212 powder, and the overall wire cost is problematically high for many applications in superconducting devices.

SUMMARY

This summary is provided to introduce a selection of concepts that are further described below in the Detailed Description. This summary is not intended to identify key or essential features of the claimed subject matter, nor is it to be used as an aid in limiting the scope of the claimed subject matter A novel method is described to assemble a multi-sub-element billet containing an array of compressed textured-powder bars (TP bars) of Bi-2212 in a silver alloy matrix and to extrude and draw the billet to fine wire with uniform properties. Specifications are presented for the cross-sectional shape of the bars, the alloy composition and shape of the elements of the silver alloy matrix, and the method for assembly and drawing that produce uniform drawing of a multi-sub-element billet into fine wire with local area ratio LAR=Ag:Bi-2212~1:1. The method thereby enables both enhancement of the superconducting performance of the wire and reduction of the wire cost compared to the conventional oxide-powder-in-tube (OPIT) method.

An improved design is presented for a composite billet containing an array of TP bars in a geometry that is compatible with assembly and drawing of a billet with LAR~1:1. A method is presented of compressing the bars suitable for the billet geometry in an inert gas environment. Assessment of the texture parameter in the TP bars is reported, and substantiates similar properties that were obtained in earlier work with square bars. A choice of composition is reported for the silver alloy components of the billet assembly. Methods of drawing of the billet are disclosed that control the deformation of the composite billet during area-reducing draw to fine wire so that the shape and registration of the constituent bars is preserved. Lastly a method is disclosed to fabricate a cable-in-conduit conductor containing the textured-powder Bi-2212/Ag wires that enables robust forming of windings and also provides in-cable containment of a buffer gas flow under high pressure during the high-temperature heat treatment of the winding that is required to produce optimum superconducting performance in the Bi-2212 cores.

In an aspect of the disclosure, a polyhedral billet geometry in which tetrahedral TP bars are arrayed in a 4-fold symmetric pattern around a round core rod to form a layer of sub-elements, and the assembly is contained within a silver alloy sheath tube.

In an aspect of the disclosure, a thin silver cladding foil strip (for example 50 microns thick) is located in a 3-sided flared U-channel in a forming die and coined to form a silver-alloy U-channel.

In an aspect of the disclosure, a silver-clad TP bar is formed by inserting a silver U-channel into a forming die, filling its interior uniformly with Bi-2212 fine powder, folding the side flaps of the U-channel on top of the powder filling, and compressing laterally in a hydraulic press to texture the powder, hermetically seal the side walls of the silver cladding.

In an aspect of the disclosure, a reinforced TP bar is formed by forming a U-channel from a thicker foil of silver alloy (for example 200 microns thick, Ag+0.2% Mg alloy), inserting a silver-clad TP bar in the U-channel, folding the flaps of the U-channel so that they overlap on the open side of the U, and then hydraulically compressing to seal the flaps and form a reinforced TP bar.

In an aspect of the disclosure, a multi-layer billet geometry in which a succession of layers of reinforced TP bars are arrayed symmetrically around a round core, with each succeeding layer being assembled within a sheath tube and drawn down sufficiently to lock the registration of that layer in its polyhedral geometry, and succeeding layers are assembled by repeating that process.

In an aspect of the disclosure, a tetrahedral forming die set for forming and compressing textured-powder bars in a tetrahedral geometry using a compression die set comprises a female die containing the desired tetrahedral prism cavity, a rectangular prism cavity extending above it, a male rectangular prism compression die, and a configuration of surfaces the define a hard stop to the compression when the male die reaches the top of the tetrahedral cavity.

In an aspect of the disclosure, a method for controlling the filling of fine-powder Bi-2212 into the rectangular aperture of the tetrahedral forming die uses a linear array of funnel channels to direct powder into each region of the aperture in turn, so that a uniform filling of powder is attained.

In an aspect of the disclosure, a Bi-2212/Ag cable-in-conduit configuration includes a textured-powder Bi-2212/

Ag wire that is cabled with a twist pitch in a layer around a perforated thin-wall center tube, the cable is inserted as a loose fit in a heavier-wall sheath tube, and the sheath tube is drawn down to compress the wires against the center tube and immobilize them.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

Figure 1A:
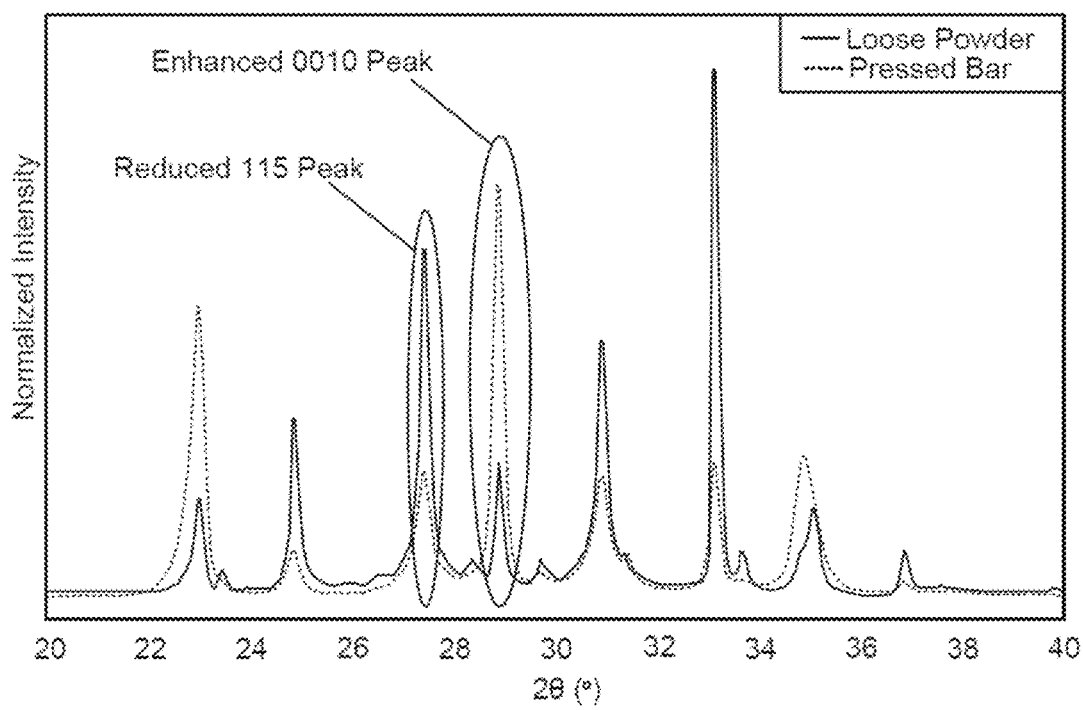
FIG. 1A is an x-ray diffraction measurement of texture parameter in cleaved faces within a TP bar of a diffraction spectra from a cleaved face, showing 115 peak (c-axis) and 0010 peak (a-b plane)

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

The superconducting material $Bi_2Sr_2CaCu_2O_x$ (Bi-2212) is the only one of the Type II high-temperature superconducting ceramics that has been successfully fabricated as a multi-filament round wire. It is a ceramic material with a perovskite crystal structure. Perovskite superconductors are structured in a layered crystal structure, and bonding at the $CuO_2$ layer is weakest. The $CuO_2$ planes convey two important properties. First, below the critical temperature, superconducting current flows preferentially in the (a-b) $CuO_2$ planes—supercurrent transport is strongly anisotropic. Second, crystalline Bi-2212 is micaceous. If a single crystal is ground to a powder, the individual grains of the powder have a very flat aspect ratio—each grain is much larger in the a-b plane than in the c-axis. Also like mica, the particles of Bi-2212 powder slide freely when they are oriented with a-b planes parallel.

After a multi-sub-element wire is completed, cabled, and then wound into a winding for a practical application, the winding must be heat-treated in its final shape to the melt temperature of Bi-2212 (~880° C.) in an oxygen-rich atmosphere. The Bi-2212 powder is melted within each sub-element contained in its channel within the silver matrix, and then the temperature is lowered gradually to re-crystallize the Bi-2212 in dendritic crystallites. The temperature is slowly lowered to anneal the grain structure within each sub-element, and indeed to grow the Bi-2212 grains to interconnect through the silver matrix among neighboring sub-elements within the wire.

In a further important improvement to wire processing, the heat treatment is performed in a high-pressure retort, typically containing ~50 bar Ar and 1 bar $O_2$. The high pressure collapses the void spaces in the solid cores and in the melt liquid, so that recrystallization and annealing are done with full density. This improvement more than doubled the attainable superconducting current density in the wire. As another improvement, a quantity of Bi-2212 fine powder can be textured by uniaxial compression. The uniaxial compression naturally orients the a-b planes of the powder grains so that they are normal to the compression axis—the compression produces a textured-powder bar (TP bar). To form a TP bar, a quantity of Bi-2212 fine powder is placed in a uniform-cross-section elongated cavity in a compression die, and a conformal male die is placed on top of the powder so that the powder is confined within a uniform-cross-section channel. The male die is pressed into the channel in a hydraulic press, so that the powder is uniformly compressed in the direction normal to the axis of the channel. The compression also produces a cold-sintering of the powder so that the bar is weakly bound in its shape once removed from the rectangular channel.

Experiments have been performed in which textured-powder bars are fabricated. A bar was split along the texturing plane (normal to the direction of compression and to the bar axis) to expose a layer of the bar's interior. The split sample was mounted for analysis of the morphology and texturing of the powder particles. X-ray diffraction (XRD) analysis was used to determine the texture fraction of the exposed layer of the bar. XRD was performed using the Bragg-Brentano method. FIG. 1A shows the XRD spectrum of one sample, in which specific diffraction directions are identified that are produced by diffraction from crystallites with an ordered a-b plane (0010) and with completely disordered a-b planes (115). The texture parameter $\tau$ is extracted from the signal strengths of those two peaks, weighted by their oscillator strengths:

$$\tau = \frac{I(0010) - 0.25 I(115)}{I(0010) + 0.75 I(115)} \qquad \text{Eq. (1)}$$

Figure 1B:
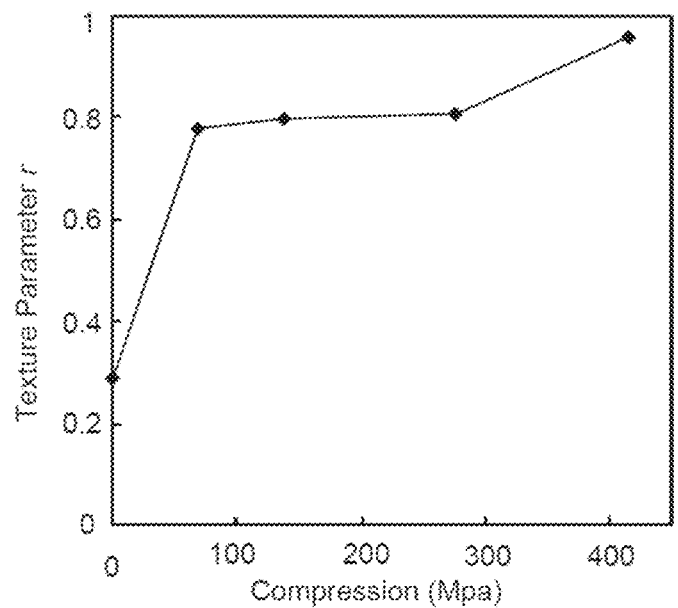
FIG. 1B is a graph illustrating texture parameter as a function of compression.

FIG. 1B shows the dependence of τ on compression: a texture of >70% could be achieved when Bi-2212 powder of particle size ~1 μm is compressed into 4 mm square-cross-section bars with a compressive stress of ~200 MPa at room temperature. The bars were split at multiple locations through the thickness of the bar to assess the degree to which texturing was homogeneous. Very little variation of τ was observed, indicating that texturing is homogenous through a 4 mm square bar.

Development of the method of compression in the forming die set showed that there was significant shear friction along the side faces of the female die as the powder was compressed by the male die. This friction actually led to gouging of the side walls (the micaceous Bi-2212 particles are much harder than even the tempered steel surface of the female die), and the shear produced a gradient in strain within the bar that caused the bar to actually curve when it was removed from the die after compression. This curve was compensated for by re-building the die set with a reverse curve, so that the bar bent straight when it was removed from the die. The wear on the side walls was compensated by lining the side walls with strips of tempered steel shim, and replacing the shims after each pressing.

Textured-powder bars can be assembled into a copper-clad silver billet and drawn to fine wire. Studies of the drawn wire showed that the textured-powder within the bar has sliding friction during an area-reducing draw that was much less than that of an un-textured filling of Bi-2212 powder within a round tube, so that it draws uniformly without sausaging or breaks.

Uniaxially compressing a mixture of silver nanopowder and Bi-2212 fine powder has been shown to be beneficial. Bi-2212 melts at a lower temperature wherever a particle of Bi-2212 is in contact with a silver surface. In a mixture of Ag nanopowder with Bi-2212 fine powder, such interfaces are dispersed throughout the volume of each sub-element, so the dynamics of melt and re-crystallization are significantly promoted during the annealing stage of heat treatment.

Billet Geometry

The billet geometry for assembling textured-powder Bi-2212 bars should provide axisymmetry of a multiplicity of the bars in the space between a round billet core subassembly and a cylindrical Ag alloy can. The geometry is further constrained to orient the textured a-b planes of the bars so that they all align azimuthally around the axis of the billet. As the billet is drawn down to fine wire, it is crucial that the interior registration of the pattern and shape of the TP cores should be preserved. There is a strong asymmetry of the shear modulus of the TP cores between shear in the a-b planes and shear in the c-direction. If the bars were to be fabricated as hexagonal prisms and stacked in a HCP registration, the a-b planes of neighboring bars in a layer would clock in their azimuthal orientations by 120°. There would be no way to orient the a-b planes of all bars azimuthally (with c-axis in the radial direction in the billet geometry).

To allow for the a-b planes to be oriented as desired, the geometry of the textured-powder bar was arranged to be tetrahedral in cross-section, so that each layer of the billet assembly constitutes a 4-fold symmetric array in which each bar is oriented with the a-b planes of its textured powder oriented azimuthally in the geometry of the billet. FIG. 2B shows a single-layer billet 10 in which eight tetrahedrals 12 are configured around a billet core subassembly 14. The angle between the short inner face of each tetrahedral bar and each of its side faces is 45°, chosen so that the faces of neighboring bars are parallel. Each tetrahedral 12 includes a U-channel 20 filled with Bi-2212.

Figure 2A:
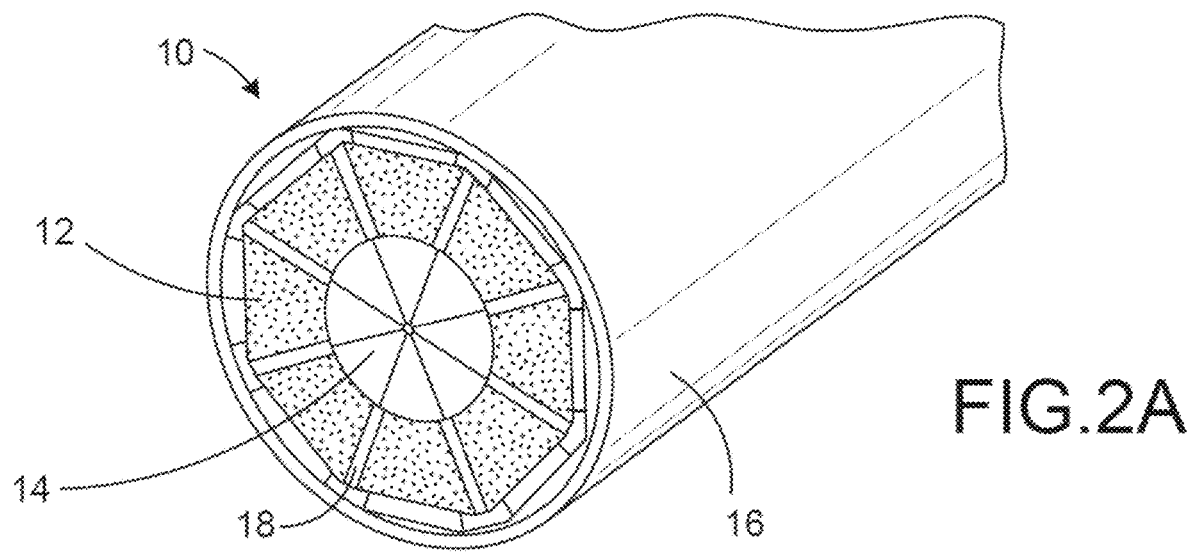
FIGS. 2A and 2B show a billet core subassembly in which eight triangular-cross-section wrapped silver-clad TP bars are assembled in a contiguous axisymmetric array, enclosed within a silver-alloy sheath tube, and drawn to compact the subassembly.
Figure 2B:
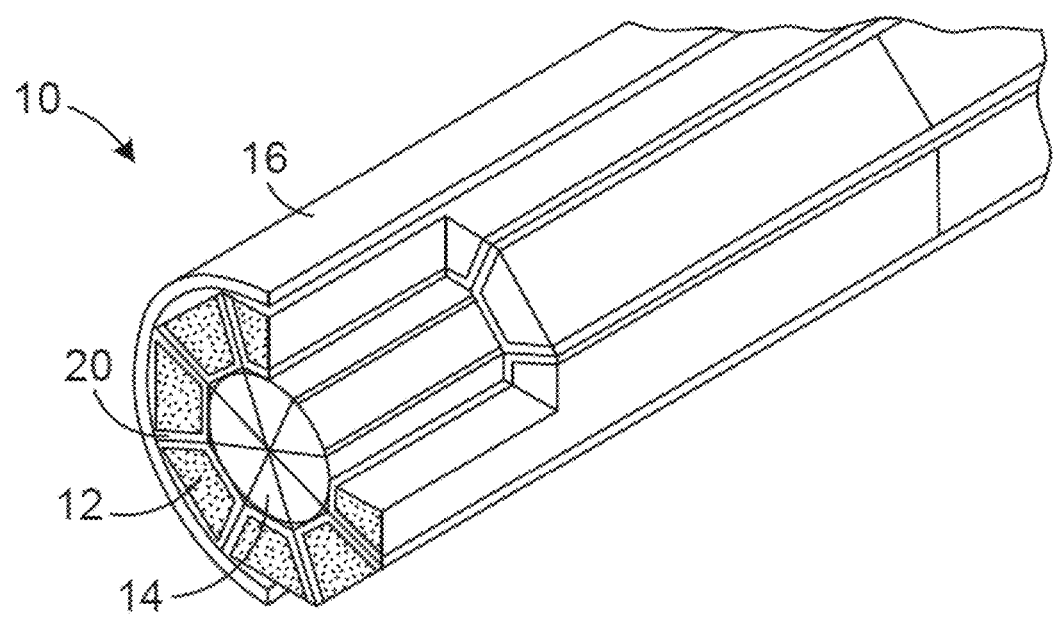

FIG. 2A illustrates an alternative method are disclosed for the separation and support of the bars in a layer of the billet. In FIG. 2A, neighboring bars are separated by a silver alloy strip 18, and another silver alloy strip is located against the outer face of each bar. The bars and strips are assembled in this pattern in the annular space between the billet core subassembly and a cylindrical sheath made of alloy silver. The diameter of the sheath tube is larger than the overall diameter of the bar assembly, so that the bars and strips can be assembled in place in a collet fixture that holds the billet core subassembly and the sheath tube concentric by clamping them from one end, the configuration is aligned in the pattern shown, and then fine silver alloy wire is wrapped onto each end region in turn to maintain the registration of the pattern. The assembly is inserted into an outer sheath tube made of alloy silver as a loose fit, and then the sheath tube is drawn onto the assembly to immobilize all elements.

FIG. 4 shows an alternative embodiment in which an array of alloy silver U-channels is configured around the billet core subassembly. The U-channels serve to locate the textured-powder bars in their positions. Each U-channel is fabricated from flat strip by coining the strip in a pair of male and female forming dies of the appropriate shape. The U-channel dimensions are chosen so that the side walls of adjacent U-channels touch when they are assembled onto the billet core subassembly. The 8 U-channels are assembled around the billet core subassembly inside a collet fixture. The U-channels are assembled with the collet loose, then the collet is tightened to compress all U-channels against the billet core subassembly to form the registration shown in FIG. 4, with one end of the array extending out the end of the collet. At the exposed end, a laser spot weld was applied to fuse the edges of the side foils of neighboring U-channels. The collet is then loosened, and the welding procedure is repeated with the other end exposed out the end of the collet. The assembly is then inserted into the sheath tube as a loose fit, the textured-powder bars are inserted into the U-channels, and the sheath tube is drawn onto the assembly to immobilize all elements.

Figure 3:
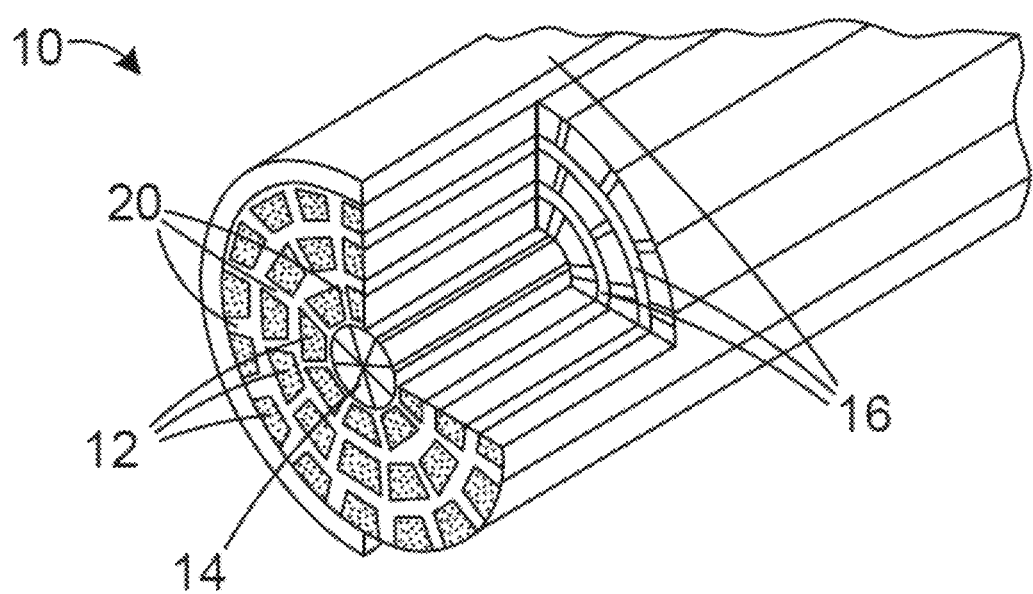
FIG. 3 is an isometric cutaway of a three-layer billet design containing the billet core subassembly, a first layer of 16 wrapped silver-clad TP bars, and a second layer of 24 wrapped silver-clad TP bars.

The billet described above can be made with any number of concentric layers. As additional layers are added, the angle of the tetrahedrals are reduced to maintain a similar fitment to the 8-channel design discussed above. Each layer of tetrahedrals includes a sheath that is drawn to immobilize the tetrahedrals within. FIG. 3 illustrates billet 10 with three layers of tetrahedrals 12. Each layer includes a sheath 16. Billet 10 may be similarly scaled up or down to have more or fewer layers.

Method of Forming Silver-Clad Tetrahedral Bars

Previous development of textured-powder bars was done using bars of square cross-section. In order to compress tetrahedral bars, the problems of shear friction and gouging of the side walls that complicated the method for square bars would have been a difficult challenge. To overcome these challenges, an improved method for pressing in which the bar is compressed inside a thin (50 μm thick) silver foil lining is discussed herein. The silver lining provides shear release between the Bi-2212 powder particles and the side walls of the die, so shear strain and gouging are eliminated altogether. The silver lining also provides a hermetic seal of the side surfaces of the bar after compression, which is a valuable barrier to in-diffusion of impurities during storage of the bar before it is assembled into a billet. In the improved method of this disclosure, the silver lining is prepared by coining a U-channel of thin silver foil so that the outside spacing of its side faces is equal to the desired short face of the tetrahedral bar. The two side faces of the U-channel are trimmed so that there is sufficient length to fold the tops of the sides over to cover the loose powder filling that will be compressed to form the bar, with the two folded flaps overlapping to provide a top lining.

Compression Die Assembly for Trapezoidal Bars

Figure 4A:
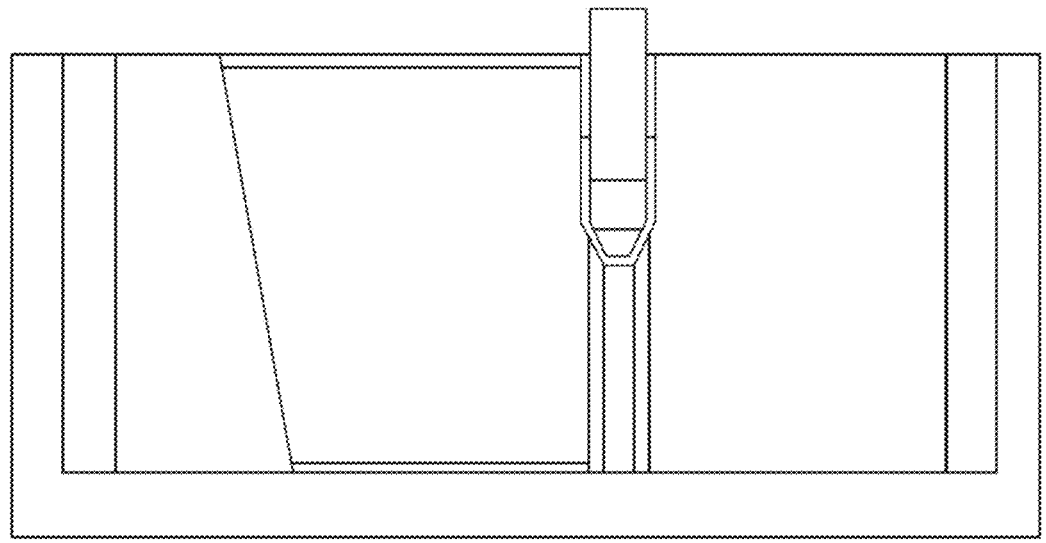
FIG. 4A illustrates a female die subassembly with a silver-foil lining and a powder filling.
Figure 4B:
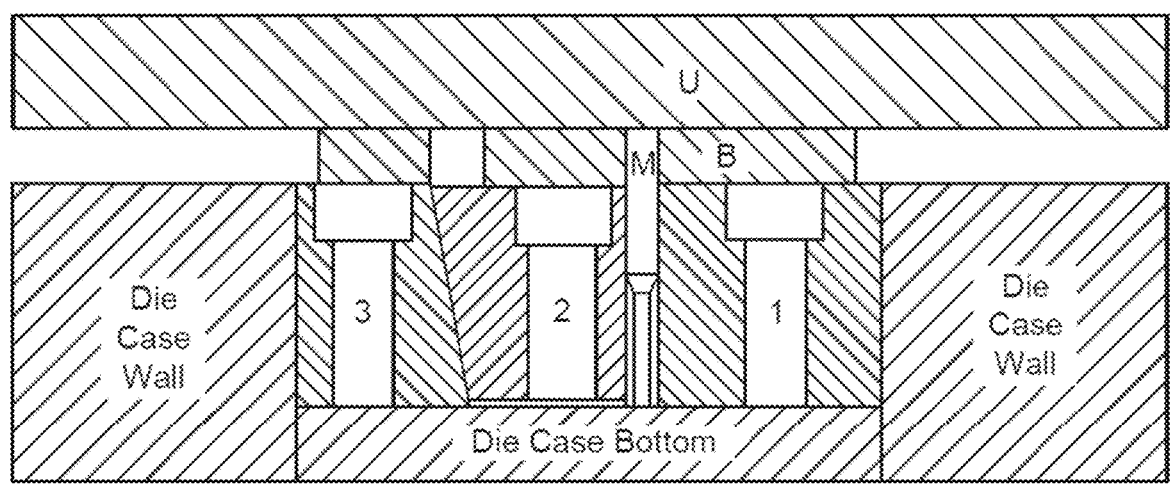
FIG. 4B illustrates a cross-section of a die assembly showing upper die platen (U), female die case and components of the female forming die (1,2,3), rectangular male die (M), and bottoming plates (B) that control the stop point of compression.

The compression die assembly consists of a female die whose cavity contains a trapezoidal cavity of the desired shape and dimensions, and a rectangular prism cavity above the trapezoidal cavity that provides the guide path in which the rectangular male die is compressed downwards. The female die is configured by assembling a set of hardened, ground bars to form the geometry of the three sides of the desired tetrahedron, as shown in FIGS. 4A and 4B. The die cavity contains the tetrahedral volume of the textured-powder bar plus a rectangular-cross-section region above the tetrahedral volume so that powder can be filled to the level necessary so that, after compression at the desired compressive force, the top surface of the powder is just even with the top of the trapezoidal region. The female die assembly contains a stop surface (see B in FIG. 5B) on the top of the die components that flank the cavity, so that the male die comes to a hard stop on those surfaces when its bottom surface reaches the top of the tetrahedral cavity in the female die. The particular arrangement of die elements shown in FIG. 5B provides this stop action, and its individual piece-parts are all simple rectangular bars or trapezoidal wedges that can be machined and tempered, and then ground to precise dimensions and mirror finish using a surface grinder.

A quantity of Bi-2212 fine powder is poured into the interior of the silver-foil-lined female die cavity using a filling fixture. The fixture comprises a linear array of tapered channels that serve as funnels to deliver equal quantities of powder into each of 10 segments of the overall bar length. Equal-mass quantities of powder are precisely measured into 10 supply ampules, and the contents of each ampule is poured into each funnel in turn. Once powder is loaded, the top flaps of the U-channel are folded over upon one another.

The male die is inserted into the gap between the two parallel sides of the female die cavity, the die assembly is located in a hydraulic press, and the press is used to compress the powder until the male die bottoms on the stop surfaces of the female die assembly.

Integration of Powder Loading, Compression, and Removal and Storage of Textured-Powder Bar The operations of filling powder, inserting the die assembly into the press, and compression to a form a silver-lined textured-powder bar must be performed in an inert-gas atmosphere. Bi-2212 aggressively adsorbs water vapor and carbon dioxide on the surfaces of all particles in the powder, and any content of $H_2O$ or $CO_2$ would dissociate during heat treatment of the final multi-filament wire and severely compromise the geometry and the superconducting performance of the wire in the winding in which it is used.

An integrated system of a gas-purge glove box and a hydraulic press is may be used to avoid the problems with $H_2O$ or $CO_2$. The platen region of a 75-ton hydraulic press is enclosed within a Lexan hermetic housing and connected via a flexible hermetic boot to a 5-port glove box. The filling of Bi-2212 fine powder into the die cavity is performed in the glove box. The assembled die is then transferred on a rail onto the lower platen of the hydraulic press, and the press is energized to compress the bar. The die assembly is then transferred back to the glove box and the textured-powder bar is removed and placed in a sealed storage vault. The billet is assembled in the same inert-gas-purged glove box, then sealed at its ends to prevent contamination during drawing.

Silver Alloy Composition

The choice of silver alloy for the foil elements and sheath tubes of the billet is an important consideration in the effort to minimize the LAR of silver in the wire. In conventional OPIT methods, Bi-2212 fine powder is poured into pure silver tubes. The tubes are sealed, drawn down to intermediate size, formed to a hexagon using a hexagonal drawing die, and then stacked and inserted into an alloy silver sheath tube. The alloy used for the sheath tube is typically Ag+Mg (0.2 wt %). The Mg addition has two purposes. First, the alloy silver has somewhat higher tensile strength than pure silver, so the silver alloy is better able to control the registration during drawing as the Bi-2212 particles re-arrange within the TP cores. Second, during heat treatment of wire in the final winding, the Mg reacts with oxygen at temperature well below the Bi-2212 melt and forms nanoscale $Mg_2O_3$ particles, which provide oxide dispersion strengthening of the matrix. The strengthening is valuable to enhance strain tolerance of the cable during operation of a high-field winding.

In our objective to minimize the LAR of silver in the textured-powder wire, it is important to make best use of the alloy strengthening of the matrix of the billet components, so that a reduced LAR of silver can control the registration of the TP cores during drawing.

In an earlier development of OPIT-method Bi-2212/Ag wire, a Ag—Mg—Sb alloy was used in the sheath tube. That development had the objective to make a wire that was sufficiently robust that it could be cabled into Rutherford cable, then heat-treated on a spool to form the high-performance annealed core morphology, and then the cable could be wound to form solenoid or racetrack windings without damage from the strain produced within the wires by coil-winding. This objective required greater matrix strength than the conventional wind-and-react strategy for windings, and that motivated them to make use of the ternary alloy.

Figure 5:
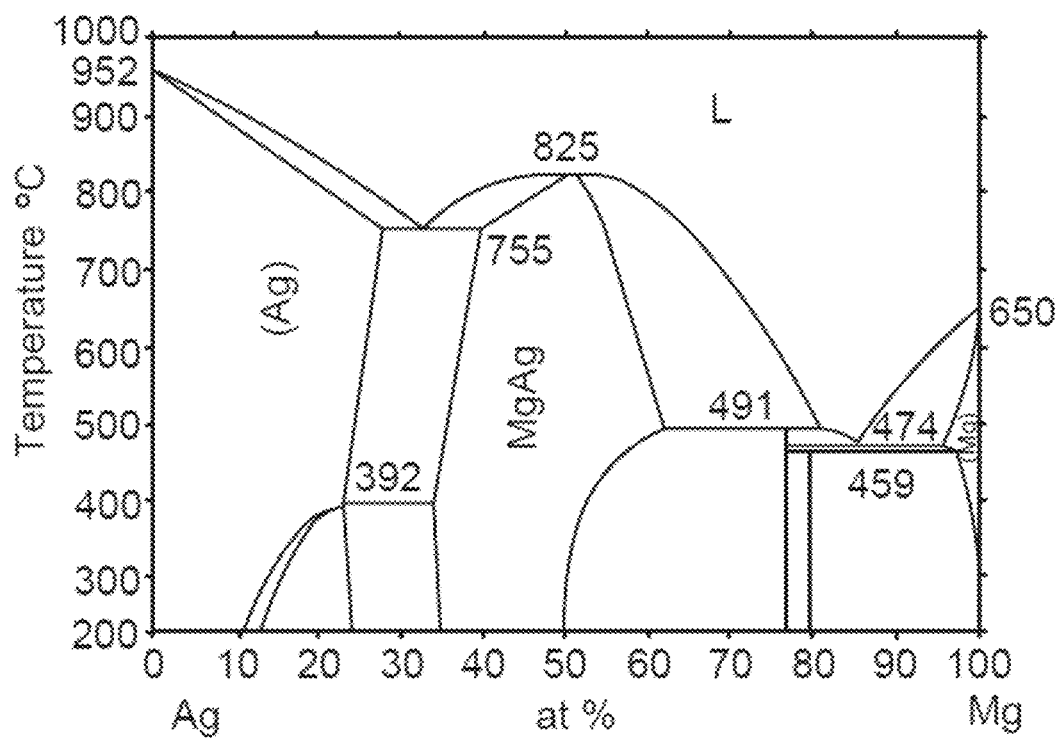
FIG. 5 is a binary phase diagram of an Ag—Mg system.

FIG. 5 shows the binary phase diagram for the Ag—Mg system. Note that, while the binary alloy is single-phase up to ~10 at %, the melt temperature decreases significantly with temperature. There is only a narrow temperature margin between the ~887° C. melt temperature to which Bi-2212 must be heated during partial-melt processing and the silver melt (960° C. for pure silver).

Extrusion and Drawing of a Multi-Layer Billet of Textured-Powder Bi-2212

It is likewise important to develop a schedule of extrusion and drawing that best stabilizes the dynamics of plastic deformation during area reduction against sub-element breaks, deformation and sausaging.

It may be desirable to begin area reduction by extruding the billet. In indirect extrusion, the cylindrical billet is contained within a cylindrical chamber and a conical female die is compressed onto the exit face of the billet. The material of the billet extrudes through the conical exit channel in the female die, and with appropriate optimization of the exit channel, control of exit channel temperature, and pressure vs. time profile, the plastic deformation can attain laminar flow that produces conformal area-reducing plastic flow of all elements in the billet registration. Extrusion is then followed by drawing, typically in stages of ~20% area reduction per pass.

It would be desirable to eliminate the starting step of extrusion if cold-drawing can be made stable with the desired LAR of Ag in the billet. In that case drawing would start with a first pass of ~30% area reduction that eliminates void spaces and metallurgically bonds the billet core sub-assembly, the silver-clad TP bars, the alloy-silver wraps, and the alloy-silver sheath tube to one another. Thereafter successive draws are done with ~20% area reduction per pass.

The billet is heated as it is extruded and drawn. The strength and flow properties of silver decline with temperature, so it is desirable to avoid increasing the temperature of the exit flow above room temperature. A heat sink may be used with an ice-water reservoir to remove heat from area-reduction as it is produced to sustain temperatures of <30° C. at the exit die.

Cable-In-Conduit Utilizing Textured-Powder Bi-2212 Wire

In some aspects, a cable-in-conduit (CIC) technology in which superconducting wires are cabled with a twist pitch in a layer around a perforated thin-wall center tube may be incorporated. The cable is inserted as a loose fit in a heavier-wall sheath tube and drawn down to compress the wires against the center tube and immobilize them. FIG. 7 shows an example of the cable-in-conduit that is built using NbTi superconducting wire.

The CIC conductor offers a particular benefit for using textured-powder Bi-2212/Ag wire in this cable-in-conduit for high-field insert windings for dipoles, solenoids, and toroids. The outer sheath tube can be made from a recently developed high-aluminum-content Ni-based superalloy (Haynes 233) that forms a self-passivating diffusion barrier and also sustains high strength at the 880° C. heat treatment conditions for OP processing. With this choice the sheath tube could itself provide the safe containment of 50 bar pressure for OP heat treatment, so that it could be performed in a standard furnace. This benefit would be of importance for fabrication of practical windings, because otherwise OP processing requires that the entire winding be heat-treated in a furnace that can heat to 880° C. and also sustain 50 atm pressure (including 1 atm oxygen) in its retort. Only one such pressure furnace exists today—it is currently cost prohibitive—and it has interior volume of only ~2 ft$^3$.

Relaxing the Purity Specifications (and Materials Cost) for Synthesis of Bi-2212 Fine Powder Conventional Bi-2212 fine powder is made by competing methods utilizing pyrolysis and aerosols. Present sales price of high-performance powder is ~$2,800/kg. That price, together with the large LAR of silver in OPIT wire, dominates the cost of wire.

Conventional powder is made using the highest purity primary metal ingredients available in order to avoid the potential for compromise of the properties of TP cores from impurities in the starting powder. However, impurities are, in fact, benign to the ultimate performance, and the cases that have potential for degradation would produce that degradation through the formation of parasitic phases during the partial-melt heat treatment. The dramatic growth of the size of a-b planes in TP cores has the potential to significantly benefit the dynamics of re-crystallization dynamics during heat treatment. The enhanced dynamics could significantly stabilize formation and growth of textured Bi-2212 during annealing, and correspondingly make the final properties less dependent upon purity of the starting powders. If it were possible to relax those specs to industrial grade, the price would drop by a factor of around two.

The combination of the innovations described above address the three main cost drivers for Bi-2212 that have inhibited its utilization in practical coils: the large LAR of Ag, the cost of starting ingredients for Bi-2212 powder synthesis, and the OP processing of final windings.

Three-Layer Billet Studies

Figure 6:
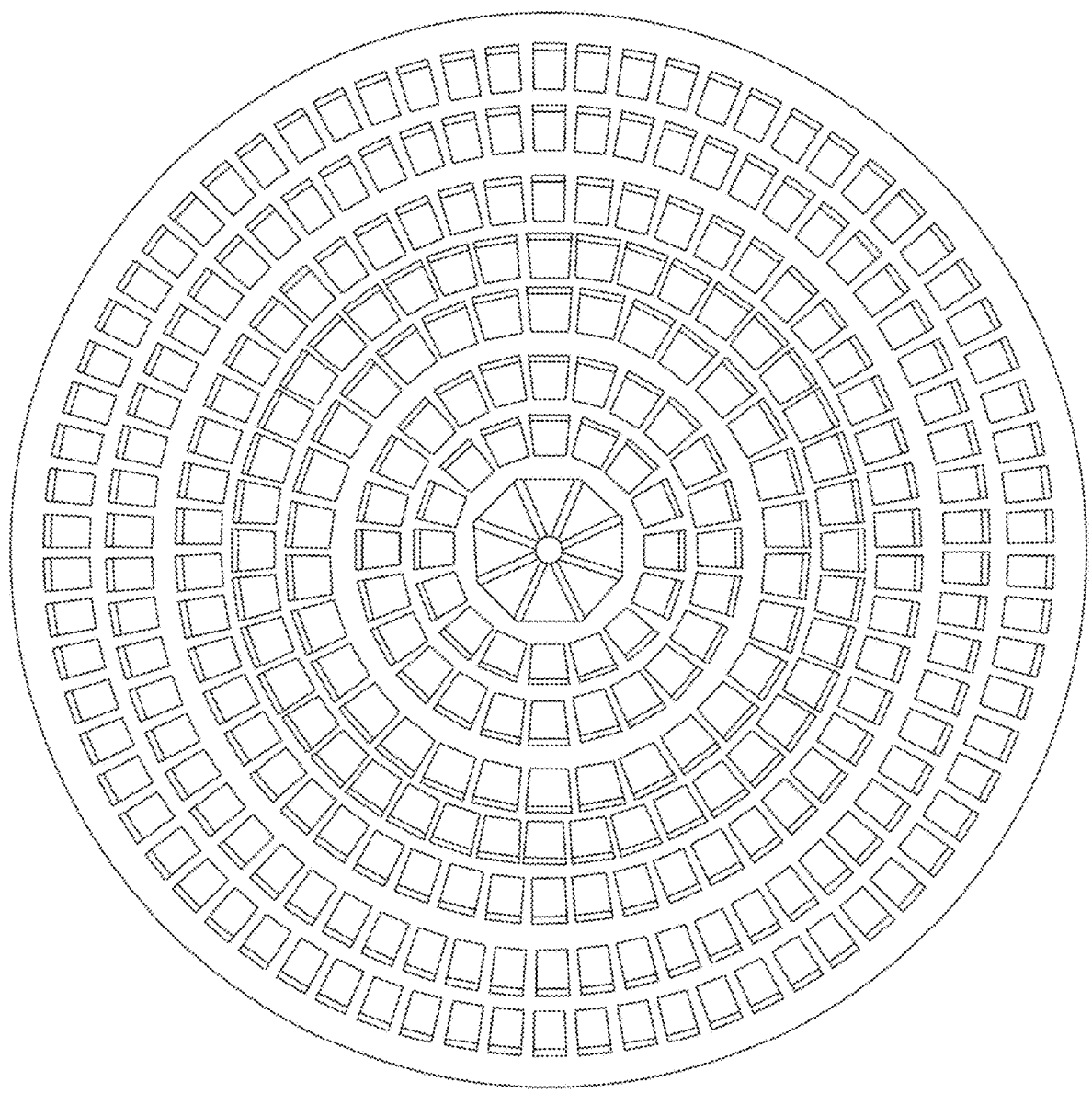
FIG. 6 shows an eight-layer billet containing 288 sub-elements, embodying the strategy described herein.
Figure 8:
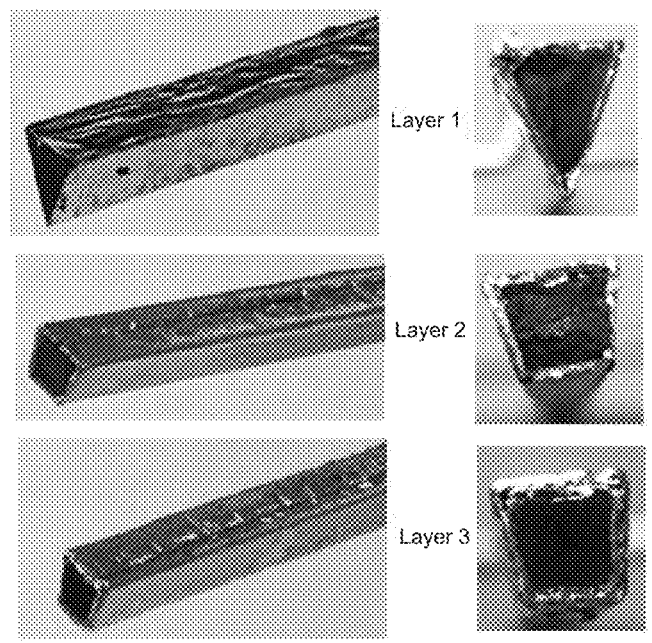
FIG. 8 shows TP bars used in three-layer billet studies.

The lessons learned from single-layer billet studies led to a revised billet design that is used in three-layer billet studies. FIG. 8 shows the triangular TP bar used in the central core (layer 1), and the tetrahedral TP bars used in layers 2 and 3. All bars have comparable area and comparable LAR. FIG. 6 shows an eight-layer billet containing 288 sub-elements, embodying the above strategy.

Figure 9A:
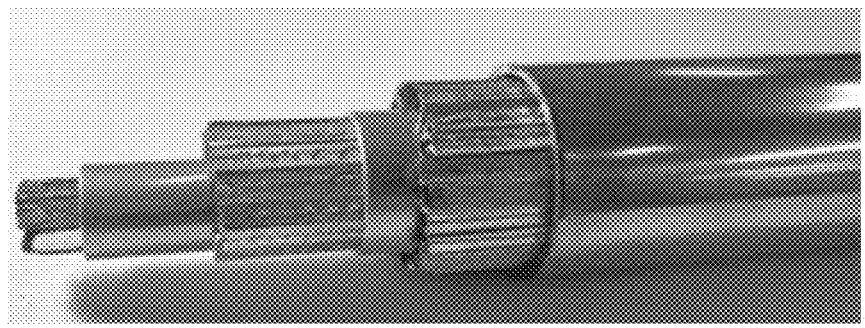
FIG. 9A shows a three-layer billet.
Figure 9B:
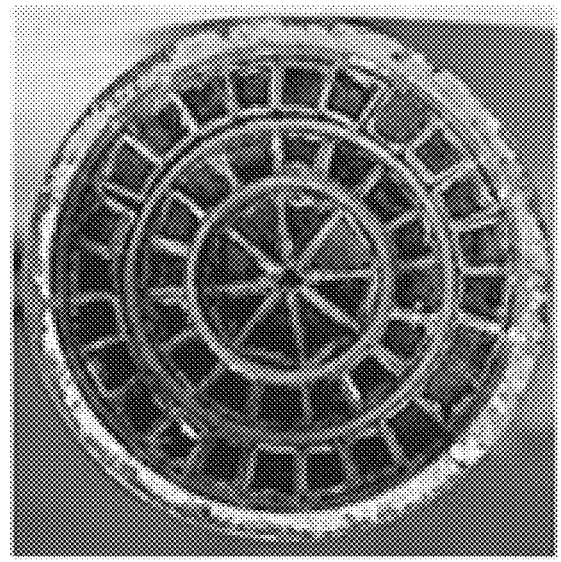
FIG. 9B shows a cross-section of a three-layer billet with triangular-cross-section TP bars in its core.
Figure 10A:
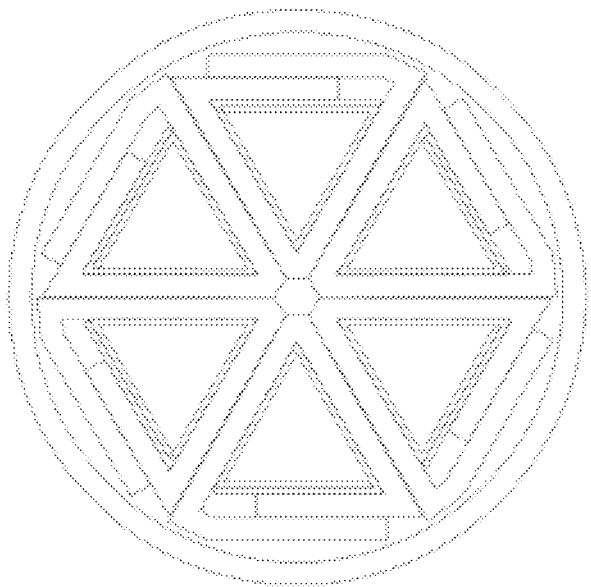
FIG. 10A shows a one layer billet in loose form.
Figure 10B:
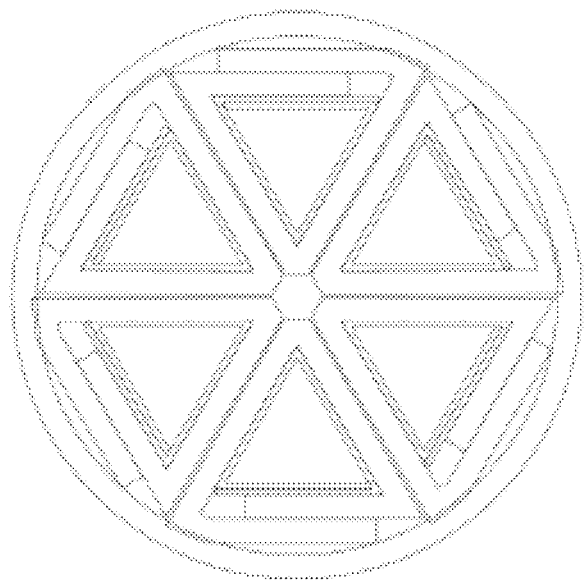
FIG. 10B shows a one layer billet in drawn form.
Figure 11A:
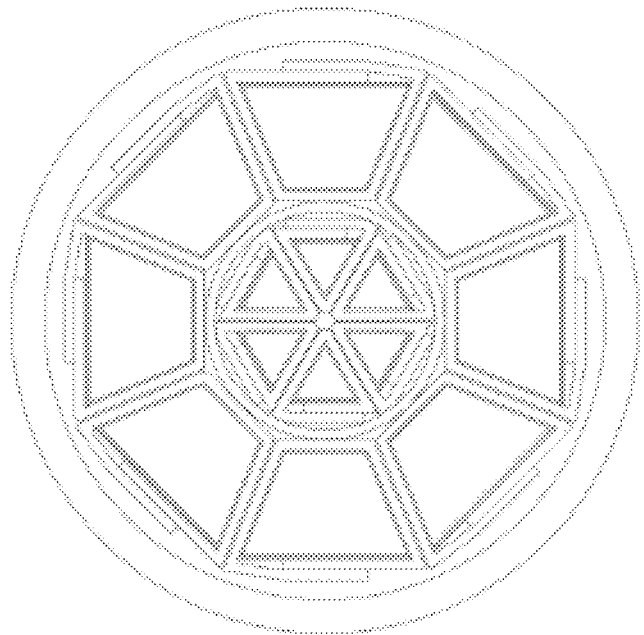
FIG. 11A shows a two layer billet in loose form.
Figure 11B:
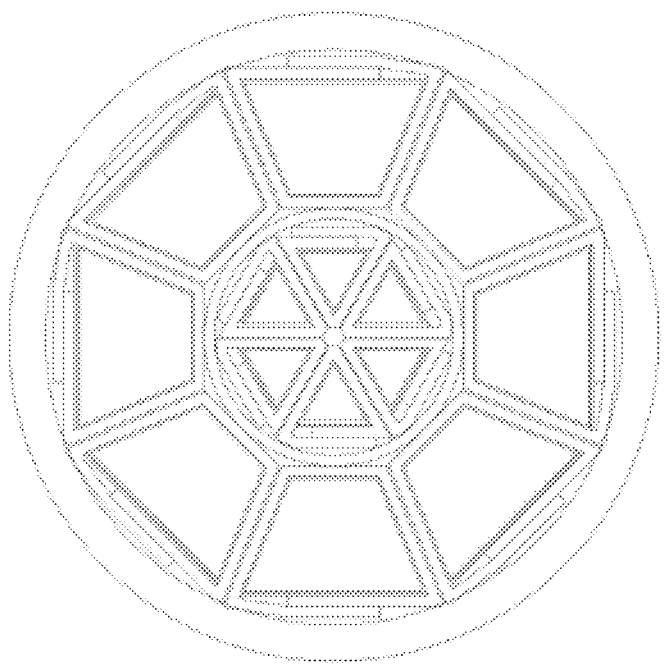
FIG. 11B shows a two layer billet in drawn form.
Figure 12A:
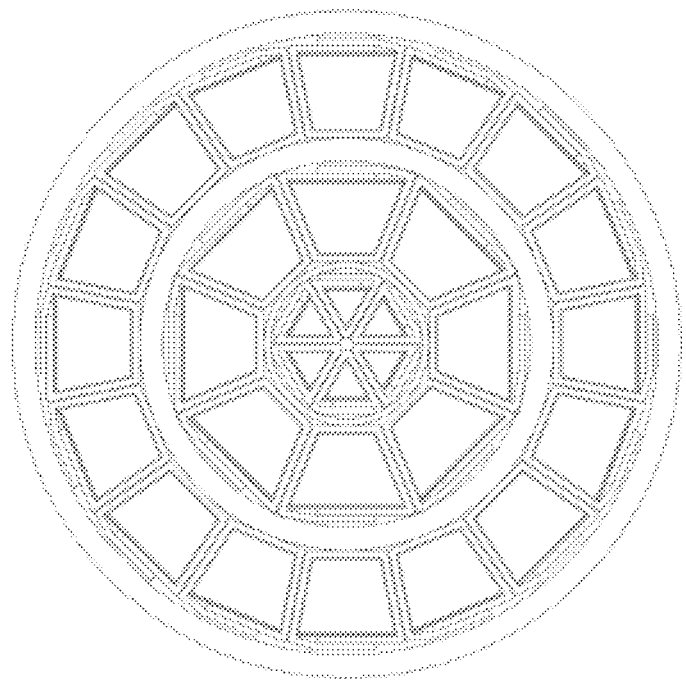
FIG. 12A shows a three layer billet in loose form.
Figure 12B:
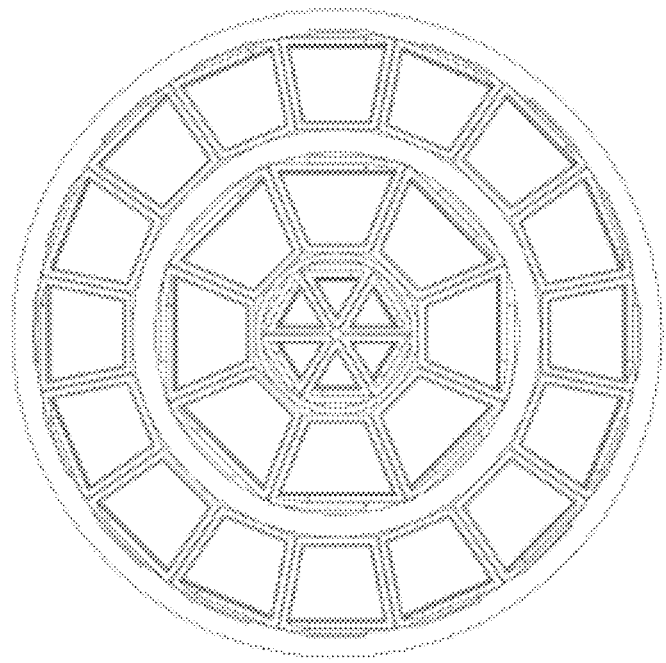
FIG. 12B shows a one layer billet in drawn form.
Figure 13A:
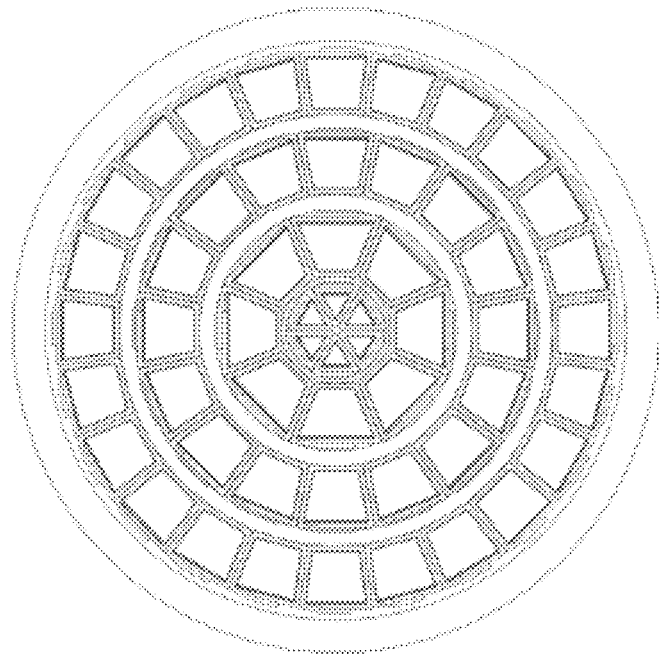
FIG. 13A shows a four layer billet in loose fit.
Figure 13B:
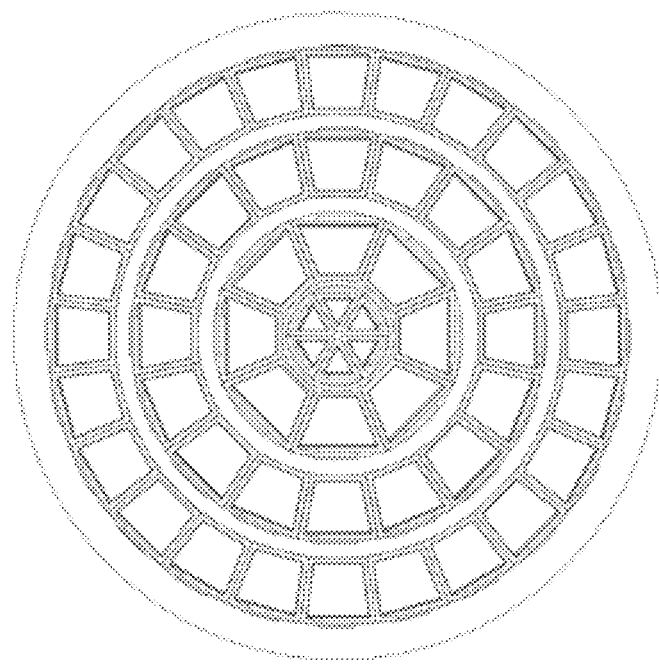
FIG. 13B shows a four layer billet in drawn form.

FIGS. 9A and 9B show a three-layer billet that was assembled as the first 3 layers and a cross-section of the billet. The bars are arranged in layers of 8-16-24, with wedge angles that produce a conformal stacking. The alloy Ag sheath tubes surrounding layers 1 and 2 are 0.7 mm thick; the outermost sheath is 1.5 mm thick. The LAR of the overall billet is approximately 1.3:1.

Stress Management and Heat Treatment of TP Wire in Cables and Windings

Figure 7A:
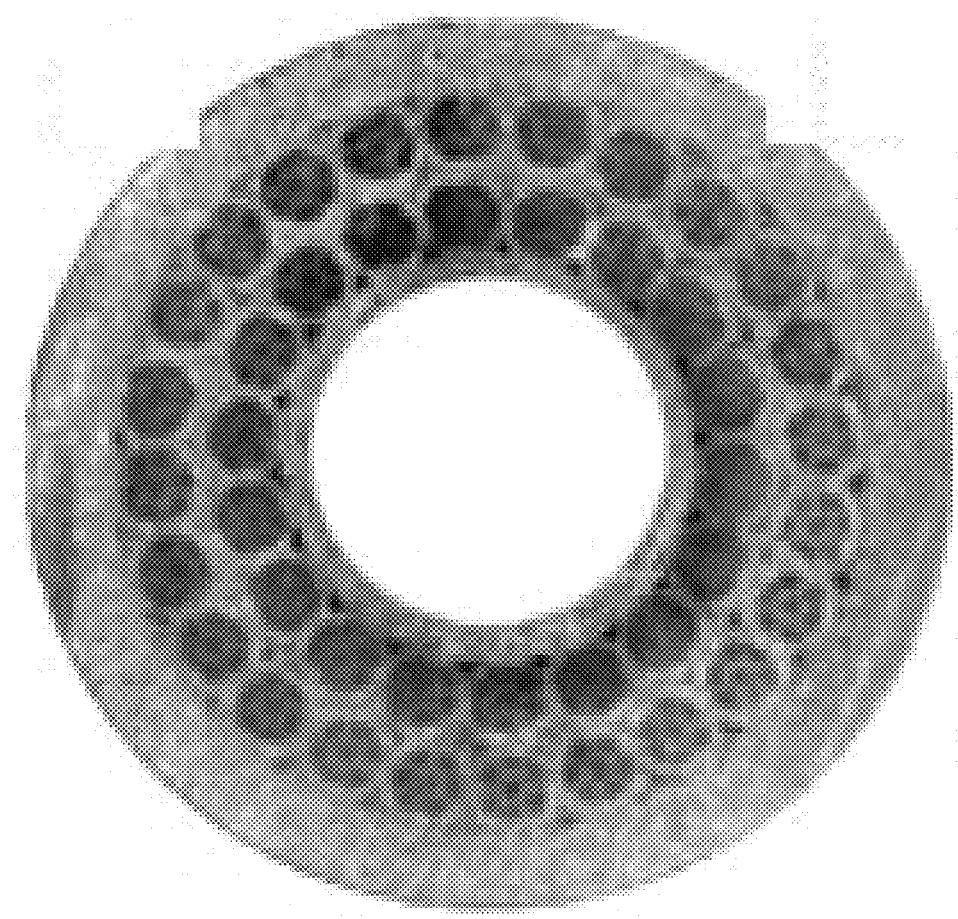
FIG. 7A shows a 2-layer SuperCIC cable fabricated using OPIT Bi-2212/Ag wire.
Figure 7B:
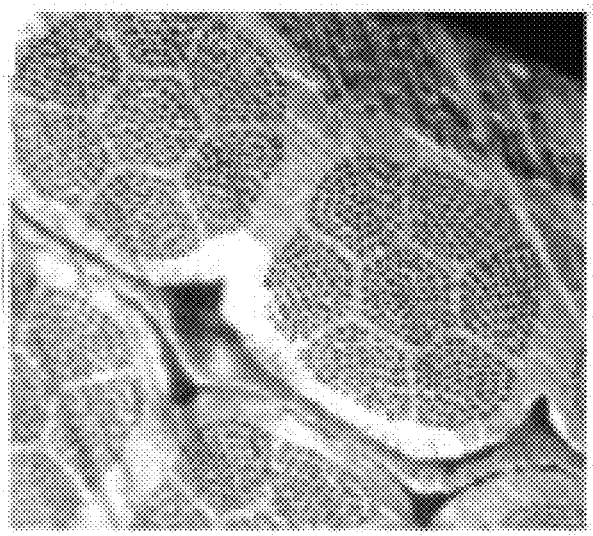
FIG. 7B shows a close-up view of the wires between layers in a compacted cable.

The utilization of TP Bi-2212/Ag wire for applications to high-field magnets require a cable and coil technology that can support both the in situ OP heat treatment of final-geometry windings and stress management at the cable and sub-winding level that can support fabrication and assembly of hybrid windings. A SuperCIC cable is shown in FIG. 7A. The Bi-2212/Ag wires are cabled with twist pitch onto a perforated center tube, the cable is pulled as a loose fit into a sheath tube, and the sheath is drawn down onto the cable to compress the wires against the center tube and immobilize them. FIG. 7B shows a close-up of the wires between layers in the compacted cable. SuperCIC provides stress management at the cable level, formation of compact end windings, and fabrication and separate heat treatment of sub-winding assemblies.

SuperCIC provides a particularly interesting basis for windings utilizing TP Bi-2212 wire. The outer sheath tube could be made from a recently developed high-aluminum-content Ni-based superalloy (Haynes 233) that forms a self-passivating diffusion barrier and also sustains high strength at the 880 C heat treatment required for OP processing. The sheath tube could itself provide safe containment of 50 bar, so OP heat treatment could be performed in a standard furnace. This benefit would be of importance for fabrication of practical Bi-2212 windings and sub-windings.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A billet for forming a textured-powder Bi-2212 wire, the billet comprising:
    a billet core subassembly comprising a plurality of triangular-cross-section silver-clad TP bars, assembled in a contiguous axisymmetric array, inserted within an alloy-silver sheath tube and drawn to compact the triangular bars and the sheath tube;
    a first plurality of silver-clad tetrahedral sections surrounding the billet core subassembly; and
    powdered Bi-2212 disposed in each tetrahedral section, wherein each tetrahedral section of the first plurality of tetrahedral sections comprises a silver-clad TP bar that is wrapped in an alloy-silver wrap and further compacted to bond the wrap to the silver-clad TP bar.

2. The billet of claim 1, further comprising a first cylindrical sheath of silver alloy that surrounds the first plurality of tetrahedral sections.

3. The billet of claim 1, further comprising a second plurality of tetrahedral sections disposed concentrically around the first plurality of tetrahedral sections.

4. The billet of claim 3, further comprising a second cylindrical sheath of silver alloy that surrounds the second plurality of tetrahedral sections.

5. The billet of claim 1, wherein the billet comprises a local area ratio of Ag to Bi-2212 of 1:1.

6. The billet of claim 1, wherein the wrap of each silver-clad TP bar is made of a binary Ag—Mg alloy.

7. A cable-in-conduit conductor comprising:
    a perforated inner tube;
    a plurality of superconducting Bi-2212/Ag wires surrounding the perforated inner tube in two layers;
    an outer sheath surrounding the plurality of superconducting wires,
    wherein each superconducting wire of the plurality of super conducting wires comprises a plurality of tetrahedral sections surrounding a billet core subassembly.

8. The cable-in-conduit conductor of claim 7, wherein the plurality of super conducting wires are configured with a twist pitch.

9. The cable-in-conduit conductor of claim 7, wherein the outer sheath comprises a high-aluminum-content Ni-based superalloy.

10. A method of fabricating a billet, the method comprising:
    surrounding a billet core subassembly with a first plurality of tetrahedral silver-wrapped TP bars;
    inserting the billet core subassembly and the first plurality of tetrahedral silver-wrapped TP bars into a first alloy-silver sheath tube; and
    drawing the first sheath tube down to lock a registration of the first plurality of tetrahedral silver-wrapped TP bars.

11. The method of claim 10, further comprising:
    surrounding the first sheath tube with a second plurality of tetrahedral sections;
    inserting the second plurality of tetrahedral sections into a second sheath tube; and
    drawing the second sheath tube down to lock a registration of the first plurality of tetrahedral sections.

12. The method of claim 11, wherein each tetrahedral TP bar of the first plurality of tetrahedral silver-clad TP bars is enclosed in an alloy-silver wrap and compacted to bond the wrapped TP bar.

13. The method of claim 12, wherein the billet comprises a local area ratio of Ag to Bi-2212 of 1:1.

* * * * *